(12) United States Patent
Chun et al.

(10) Patent No.: US 8,565,593 B2
(45) Date of Patent: Oct. 22, 2013

(54) PHOTOGRAPHING APPARATUS

(75) Inventors: Jong Hwa Chun, Daejeon (KR); Hag Ju Kim, Seoul (KR); Dong Geun Yoo, Daejeon (KR); Byong Jae Ryu, Daejeon (KR)

(73) Assignee: Korea Institute of Geoscience and Mineral Resources (KR)

( * ) Notice: Subject to any disclaimer, the term of this patent is extended or adjusted under 35 U.S.C. 154(b) by 0 days.

(21) Appl. No.: 13/449,487

(22) Filed: Apr. 18, 2012

(65) Prior Publication Data

US 2013/0188944 A1 Jul. 25, 2013

(30) Foreign Application Priority Data

Jan. 20, 2012 (KR) ........................ 10-2012-0006490

(51) Int. Cl.
*G03B 19/00* (2006.01)
*G03B 17/48* (2006.01)

(52) U.S. Cl.
USPC .......................................................... 396/431

(58) Field of Classification Search
USPC ................... 396/431; 348/136, 137; 356/318; 362/259, 553, 554
See application file for complete search history.

(56) References Cited

U.S. PATENT DOCUMENTS

| 6,190,022 B1* | 2/2001 | Tocci et al. | 362/259 |
| 6,590,640 B1* | 7/2003 | Aiken et al. | 356/3.01 |
| 7,075,661 B2* | 7/2006 | Petty et al. | 356/603 |
| 7,773,120 B2* | 8/2010 | Simon | 348/218.1 |
| 2011/0141345 A1* | 6/2011 | Ramsey et al. | 348/370 |
| 2012/0194671 A1* | 8/2012 | Meiring et al. | 348/137 |

FOREIGN PATENT DOCUMENTS

| JP | 0579820 | 3/1993 |
| JP | 2000-035332 | 2/2000 |
| JP | 2001311919 | 11/2001 |
| KR | 200213258 | 11/2000 |

* cited by examiner

*Primary Examiner* — Clayton E LaBalle
*Assistant Examiner* — Warren K Fenwick
(74) *Attorney, Agent, or Firm* — Cantor Colburn LLP

(57) ABSTRACT

Provided is a photographing apparatus for investigating a state of an outcrop. The photographing apparatus according to the present invention includes: a photographing unit photographing moving pictures or pictures; and a plurality of laser pointers outputting laser beams toward the outcrops photographed by the photographing unit to form laser points on the outcrops, wherein each laser point is disposed so that the laser beams output therefrom are output in parallel with laser beams output from other laser pointers.

2 Claims, 3 Drawing Sheets

PHOTOGRAPHING APPARATUS

CROSS-REFERENCE TO RELATED APPLICATIONS

This application claims priority under 35 U.S.C. §119 to Korean Patent Application No. 2012-0006490, filed on Jan. 20, 2012, in the Korean Intellectual Property Office, the disclosure of which is incorporated herein by reference in its entirety.

TECHNICAL FIELD

The following disclosure relates to an apparatus for photographing areas to be prospected and objects to be prospected in geological outcrop.

BACKGROUND

For research of depositional environment, exploration of geological resources, or the like, various types of geological prospection have been conducted. During the process of the geological prospection, as the member for acquiring data, video photographing, photography shooting, and the like, such as Japanese Patent Laid-Open Publication No. 2000-35332, and the like, have been conducted.

In the geological prospection fields, objects that are determined not to be moved among exposure parts of veins or exposure parts of rocks such as sedimentary rock, igneous rock, metamorphic rock, and the like, that is, objects subjected to geological prospection such as veins, sedimentary rock, igneous rock, and the like, that needs to be prospected due to the determination to be the spot naturally are referred to as outcrop.

A process of measuring the entire side of the outcrop, a size of a specific portion of the outcrop, or the like, at the time of the prospection of the outcrop may be needed.

To perform the process, the related art photographs a coin, a pack of cigarettes, a hammer, a tapeline, or the like, by a camera to acquire images for analysis in a laboratory, or the like, after the prospection.

However, most of the outcrops cannot be accessed by prospectors or when the outcrops can be accessed by prospectors, very inconvenient situations may occur. Therefore, it is very difficult to prospect a large number of outcrops.

RELATED ART DOCUMENT

Patent Document (Patent Document 1) Japanese Patent Laid-Open Publication No. 2000-35332

SUMMARY

An embodiment of the present invention is directed to providing a photographing apparatus for geological prospection capable of acquiring images through which the entire size, a partial size, or the like, of outcrops can be accurately measured while securing prospection data by photographing outcrops even when it is difficult for a worker to access outcrops.

In one general aspect, a photographing apparatus has a camera function capable of performing photography shooting and includes a laser pointer irradiating laser beams toward outcrops in parallel based on an interval between the laser points displayed on the photographed images at the time of determining the entire size, a partial size, or the like, of the outcrops, thereby making it possible to relatively accurately measure the entire size, the partial size, or the like, of the outcrops.

The photographing apparatus according to the exemplary embodiment of the present invention may include a photographing unit that takes moving pictures or photography shooting.

The photographing apparatus may further include the plurality of laser pointers outputting the laser beams toward the outcrops photographed by the photographing unit to form the laser points on the outcrops.

Each laser pointer may be disposed so that the laser beams output therefrom are output in parallel with laser beams output from other laser pointers.

DETAILED DESCRIPTION OF EMBODIMENTS

Figure 1:
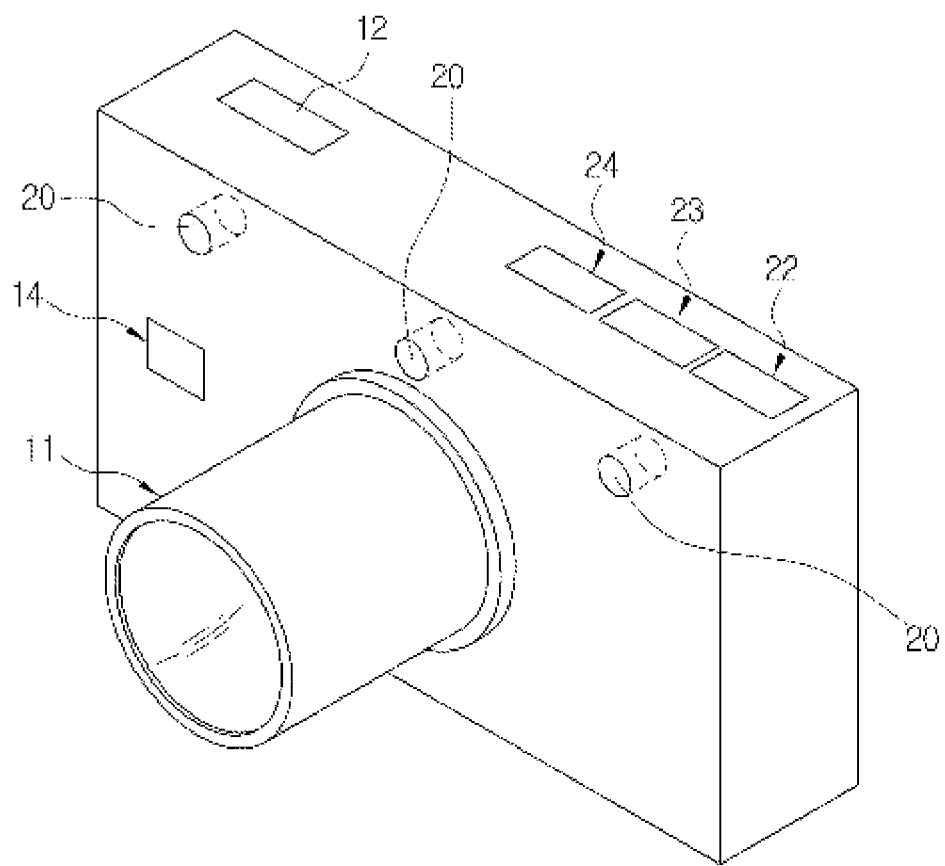
FIG. 1 is a front perspective view of a photographing apparatus for investigating a state of an outcrop according to an exemplary embodiment of the present invention.
Figure 2:
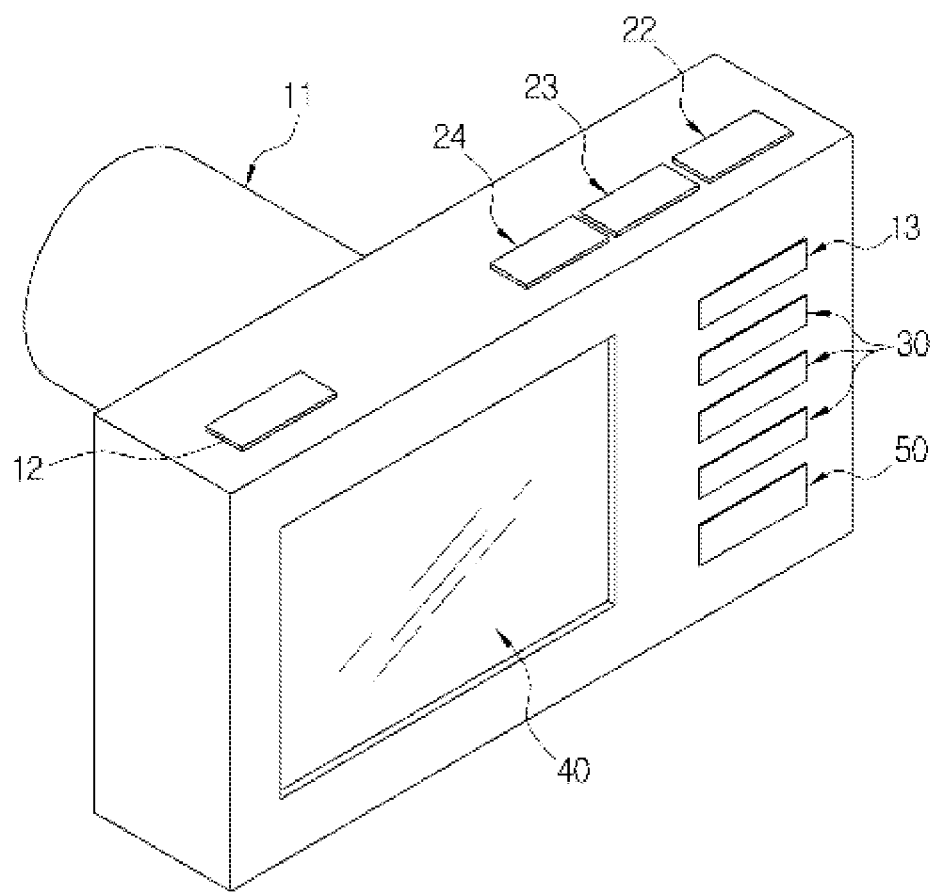
FIG. 2 is a rear perspective view of the photographing apparatus for investigating a state of an outcrop according to the exemplary embodiment of the present invention.
Figure 3:
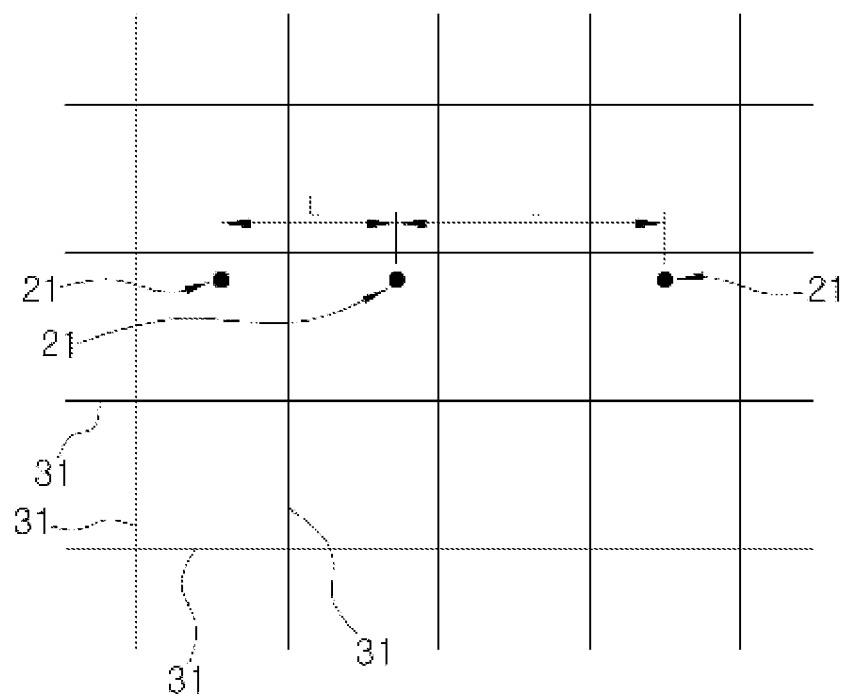
FIG. 3 is a schematic view for describing a case in which three laser points are formed on outcrops, intervals between the laser points is different from each other, and a plurality of lines are displayed by a scale display unit.

Hereinafter, technical ideas of the present invention will be described in more detail with reference to the accompanying drawings.

However, the accompanying drawings are only an example shown for explaining in more details the technical idea of the present invention and therefore, the technical idea of the present invention is not limited to the accompanying drawings.

Exemplary embodiments of the present invention relate to a photographing apparatus capable of photographing outcrops that are objects to be prospected.

Therefore, the photographing apparatus includes a photographing unit 10 capable of performing moving pictures or photography shooting.

The photographing unit 10 may be implemented in a form such as a general camera for photographing a photograph, a video camera for photography shooting, or the like.

However, the exemplary embodiment of the present invention is to provide a photographing apparatus for geological prospection capable of acquiring images (pictures or images) through which the entire size, a partial size, or the like, of outcrops can be accurately measured, while securing prospection data by photographing outcrops that cannot be easily accessed by workers.

In order to achieve the objects, the exemplary embodiment of the present invention can measure the entire size or the partial size of the outcrops based on an interval L between the laser points on the images secured by allowing laser beams output (diffused) in parallel with each other at a predetermined interval to form the laser points on the outcrops.

For this reason, the photographing apparatus according to the exemplary embodiment of the present invention includes a plurality of laser pointers 2 that can output the laser beams toward the photographed outcrops to form the laser points 21 on the outcrops.

Further, each laser pointer 20 is disposed so that the laser beams therefrom are output in parallel with laser beams output from other laser pointers 20.

That is, the plurality of laser beams are output in parallel with each other and thus, a distance (a distance from a central portion of one laser pointer 20 to a central portion of the other one laser pointer 20) between the laser pointers 20 included in the photographing apparatus corresponds to the interval L between the laser points formed on the outcrops.

Therefore, when the laser points are displayed on the outcrops, the partial size or the entire size of the outcrops can be measured by calculation based on the interval (a dimension of L) between the laser points.

In the exemplary embodiment of the present invention, a plurality of lines 31 extending in parallel with each other at a predetermined distance can be displayed on the photographed images so as to easily investigate the state of the outcrops (an extending form of a partial size, a specific layer, or the like) by using the photographed image.

When the lines 31 has a form extending in a horizontal direction and a vertical direction, the lines 31 have a form of a horizontal line and a vertical line that are drawn on a squared paper, such that they have a form in which a square is drawn on the photographed picture.

To this end, the photographing apparatus may further include a scale display unit 30 that can set the display conditions of lines as described above, prior to the photographing.

The scale display unit 30 can be implemented in various forms.

The scale display unit 30 may be implemented in an analog type so that a transparent film on which the above-mentioned lines are displayed is disposed in front of a lens 11 of the photographing unit 10.

Alternatively, the scale display unit 30 may be implemented in a digital type so that the lines are displayed in a radar.

A recent mobile phone having the camera function has a function of forming squares for adjusting a focus when photographing pictures, which leads to displaying the squares even on the photographed images as they are.

The scale display unit 30 may control the number of lines to be displayed on the photographed images. To this end, the digital type (a structure having a controller such as a central processing unit of a computer or a controller of various electronic devices) may be preferably used.

In the case of the analog type, it is inconvenient to replace a film disposed in front of the lens, or the like. On the other hand, the digital type is convenient in use by simply controlling whether the line 31 is displayed, the number of lines 31 is controlled, or the like, through the menu button, or the like.

In particular, when the scale display unit 30 is implemented in the digital type, it is possible to control whether an interval between the lines is increased in proportion to a magnification of the outcrops through a zoom function in the case in which the photographing unit has a zoom function capable of performing the magnification photographing on the outcrops.

In the exemplary embodiment of the present invention, more than three laser pointers 20 may be provided and an interval between the laser pointers 20 may be differently implemented from each other. (Consequently, the interval L between the laser pointers is provided in at least two and a dimension of the interval L may have a different form).

Alternatively, a user can control whether each laser pointer 20 outputs the laser beams, such that the interval L fitting the situations may be formed.

In the exemplary embodiment of the present invention, the laser pointer 20 means a device of diffusing the laser beams and the laser point means a point focused (formed) on an object by the laser beam output from the laser pointer 20.

Non-explained reference numeral 12 is a photographing button, non-explained reference numeral 13 is a zoom adjusting button capable of performing the magnification photographing on the outcrops, and non-explained reference numeral 14 is a flash that can be driven at the time of photographing.

Further, non-explained reference numerals 22, 23, and 24 are a laser pointer on/off switch for controlling the driving of the laser pointer 20.

Further, non-explained reference numeral 40 is a display unit capable of investigating the photographed images and non-explained reference numeral 50 is a condition setting button capable of setting various photographing conditions in the photographing device according to the exemplary embodiment of the present invention.

The photographing apparatus according to the exemplary embodiment of the present invention includes the photographing unit capable of performing the photography shooting and the laser pointer irradiating laser beams toward the outcrops in parallel based on the interval between the laser points displayed on the photographed images at the time of determining the entire size, the partial size, or the like, of the outcrops, thereby making it possible to relatively accurately measure the entire size, the partial size, or the like, of the outcrops by using the photographed images even when it is difficult for prospectors to access the outcrops.

In the exemplary embodiment of the present invention, the photographing apparatus further includes a scale display unit capable of setting the display conditions of lines prior to the photographing so that a plurality of lines extending in parallel with each other at a predetermined distance are displayed on a photographed image, thereby making it possible to more easily investigate the state of the outcrops.

In this configuration, the scale display unit can appropriately cope with the size or shape of the outcrop or the conditions of magnification photographing, or the like, by controlling the number of lines to be displayed on the photographed images.

What is claimed is:

1. A photographing apparatus photographing objects to be prospected to investigate a state of outcrops, comprising:
    a photographing unit photographing moving pictures or pictures;
    a plurality of laser pointers outputting laser beams toward the outcrops photographed by the photographing unit to form laser points on the outcrops, and
    a scale display unit setting display conditions of lines prior to the photographing so that a plurality of lines extending in parallel with each other at a predetermined distance are displayed on a photographed image,
    wherein each laser pointer is disposed so that the laser beams output therefrom are output in parallel with laser beams output from other laser pointers,
    wherein more than three laser pointers are provided and an interval between the laser pointers is differently implemented from each other,
    wherein the scale display unit is implemented in an analog type so that a transparent film on which the plurality of lines are displayed is disposed in front of a lens of the photographing unit, and
    wherein the scale display unit controls a number of lines to be displayed on photographed images.

2. The photographing apparatus of claim 1, wherein the photographing unit has a zoom function of performing magnification photographing on the outcrops.

* * * * *